United States Patent [19]

Ohkami et al.

[11] Patent Number: 4,825,359
[45] Date of Patent: Apr. 25, 1989

[54] DATA PROCESSING SYSTEM FOR ARRAY COMPUTATION

[75] Inventors: Takahide Ohkami; Nobuyuki Iijima; Teijiro Sakamoto; Toshiyuki Hirai, all of Kanagawa, Japan

[73] Assignee: Mitsubishi Denki Kabushiki Kaisha, Tokyo, Japan

[21] Appl. No.: 524,326

[22] Filed: Aug. 18, 1983

[30] Foreign Application Priority Data

Jan. 18, 1983 [JP] Japan .................. 58-6082

[51] Int. Cl.⁴ .......................... G06F 15/00
[52] U.S. Cl. .................. 364/200; 364/726; 364/736
[58] Field of Search ... 364/200 MS File, 900 MS File, 364/725, 726, 736

[56] References Cited

U.S. PATENT DOCUMENTS

| | | | |
|---|---|---|---|
| 3,296,426 | 1/1967 | Ball | 364/200 |
| 3,364,472 | 1/1968 | Sloper | 364/200 |
| 3,537,074 | 10/1970 | Stokes et al. | 364/200 |
| 3,593,351 | 6/1972 | Hong et al. | 364/200 |
| 3,815,095 | 6/1974 | Wester | 364/200 |
| 3,970,993 | 7/1976 | Finnila | 364/200 |
| 3,979,728 | 9/1976 | Reddaway | 364/200 |
| 4,041,461 | 8/1977 | Kratz et al. | 364/200 |
| 4,065,808 | 12/1977 | Schomberg et al. | 364/200 |
| 4,199,811 | 4/1980 | Borgerson et al. | 364/200 |
| 4,380,046 | 4/1983 | Fung | 364/200 |
| 4,393,457 | 7/1983 | New | 364/200 X |
| 4,435,758 | 3/1984 | Lorie et al. | 364/200 |
| 4,481,580 | 11/1984 | Martin et al. | 364/200 |
| 4,541,048 | 9/1985 | Propster et al. | 364/200 |

OTHER PUBLICATIONS

A Microprogrammed Approach to Signal Processing by Gary L. Kratz et al., IEEE Transactions on Computers, vol. c-23, No. 8, Aug. 1974, pp. 808-817.
Multimode Radar Processor by J. R. Gaskill, Jr. et al., Proc. SPIE, vol. 154, Real-Time Signal Processing, 1978, pp. 141-149.
Array Processor Provides High Throughput Rates by Woodrow R. Wittmayer, Computer Design, Mar., 1978, pp. 93-100.

*Primary Examiner*—Gareth D. Shaw
*Assistant Examiner*—Jonathan C. Fairbanks
*Attorney, Agent, or Firm*—Bernard, Rothwell & Brown

[57] ABSTRACT

A data processing system for array computation including a global memory, a control processor unit for executing microprograms preloaded from the global memory in a local memory of the processor unit, and an array processor unit controlled by the instructions generated by the control processor unit from the microprograms for executing array computations with an array of data preloaded from the global memory into a local array memory, the selected architecture of the array processor unit being dynamically reconfigurable to best meet array computation to be performed, and to provide reduced overhead operations.

3 Claims, 5 Drawing Sheets

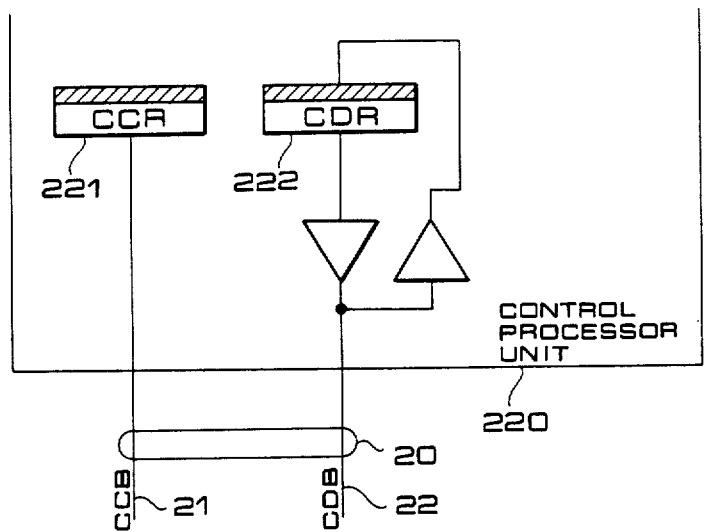
FIG. 6
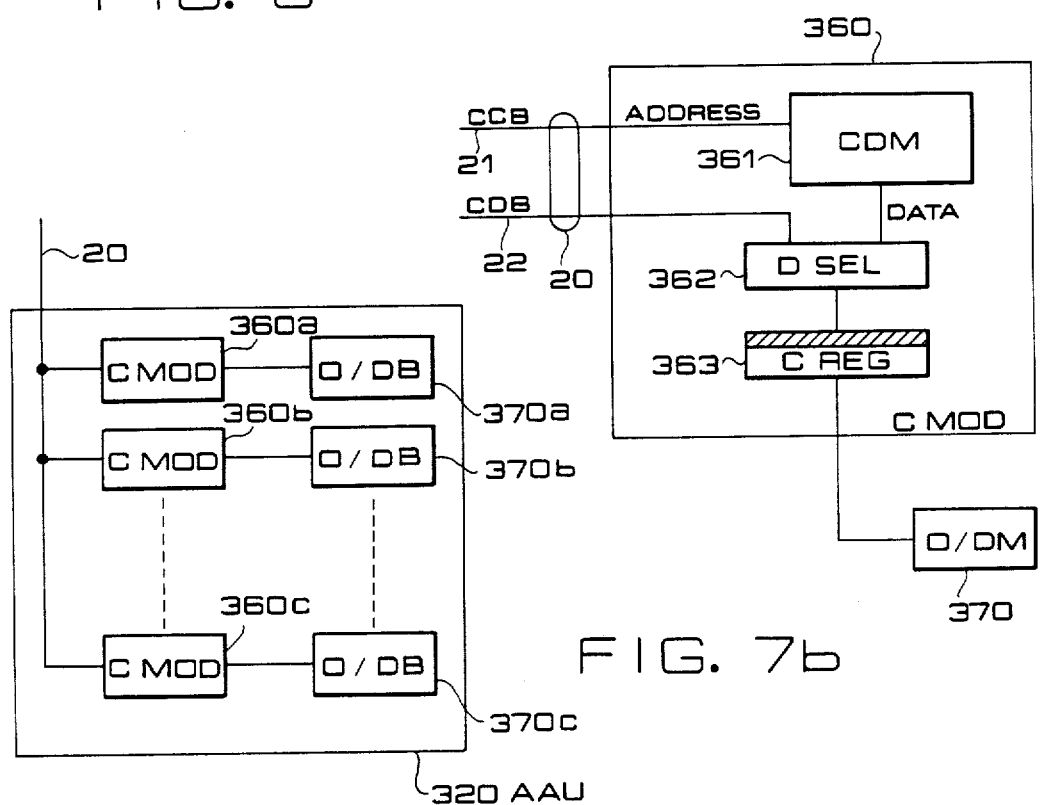
FIG. 7b
FIG. 7a

DATA PROCESSING SYSTEM FOR ARRAY COMPUTATION

FIELD OF THE INVENTION

The present invention relates to a data processing system for performing fast array computations and, particularly, to a data processing system consisting of a plurality of processing units having individual functions and linked with each other through buses.

DESCRIPTION OF THE PRIOR ART

Generally, scientific data processing includes large array computations, which take a significantly long time when performed by an ordinary general-purpose computer. To reduce this processing time, there have been proposed various data processing systems dedicated to such array computations, and some of the systems have been put into practice. These data processing systems used for array computations may be classified into the following categories:

A. Dedicated processors capable of performing high-speed arithmetic operations for some kinds of array computation, as disclosed, for example, in an article entitled "A Microprogrammed Approach to Signal Processing", by G. L. Kratz et al., IEEE Trans. Computers, Vol. C-23, No. 8, August 1974, pp. 808–817, and "Multimode Radar Processor", by J. R. Gaskill, Jr. et al., Proc. SPIE, Vol. 154, Real-Time Signal Processing, 1978, pp. 141–149.

B. Array processors which are connectable to a general-purpose computer via the I/O interface and designed to perform array computations faster than the general-purpose computer, as disclosed, for example, in an article entitled "Array Processor Provides High Throughout Rates", by W. R. Wittmayer, Computer Design, March 1978, pp. 93–100.

C. Integrated array processors adapted to perform individual array computing functions and sharing a central processing unit of a general-purpose computer, as disclosed, for example, in an article entitled "HITAC M-200H Integrated Array Processor," by Kawabe et al,. Proc. Technical Meeting of the Institute of Electronics and Communication Engineers of Japan, No. EC80-79, 1980. (in Japanese)

D. Supercomputers performing super high-speed array computation in scientific computing processes, as disclosed in an article entitled "The Cray-1 Computer System," by R. M. Russel, CACM, Vol. 21, No. 1, January 1978, pp. 63–72.

The processors in group A are usually designed to perform only some specified array computations at a high speed. However, the processors cannot handle other array arithmetic operations for which the processors were not designed, or can carry out the other operations only at a very low speed, and therefore, they are lacking in flexibility. Array processors in group B are able to perform more array computations and provide more flexibility than processors of group A as well as offering better performance than the general-purpose computer, but the group B processors are unsuitable in speed and performance where the speed and performance of dedicated processors are needed. A processor of group B is connected as an I/O device to a general-purpose computer, that results in a large overhead for I/O operations.

Integrated processors in group C have substantial flexibility and economical advantage in array processing by sharing a CPU of a general-purpose computer, but on the other hand are as capable as the array processors in group B.

Supercomputers in group D are oriented toward handling large-scale scientific computations, and are capable of performing array computation at very high speed. The computers can handle a large amount of data and perform high precision computations, but their large-scale structure is not economical for such an application wherein high precision results are not required.

Accordingly, data processors categorized in groups A through D are generally unsuitable for applications with the following requirements:

a. Scientific computation, particularly, arithmetic processes dominated by array computation.

b. Processes which need as fast a speed as a dedicated processor.

c. Processes which do not need a high precision result.

d. Processes which are altered dynamically by the program.

e. Processes which are rendered deficient by having a large overhead required to cope with processor architectural alteration.

It is an object of the present invention to provide a data processing system for array computation which has a fast and flexible operational capability.

Another object of the invention is to provide a data processing system for array computation which alleviates the overhead in the architectural alteration.

BRIEF DESCRIPTION OF THE DRAWINGS

FIG. 6 is a diagram showing an interface connecting a control processor unit with control buses of FIG. 1;

FIGS. 7a and 7b are diagrams showing the arrangement of control modules for operators or bus selectors of units of FIG. 2;

SUMMARY OF THE INVENTION

The present invention is summarized in a data processing system for array computation wherein array processor operators have input and output selectors connected to a plurality of local data buses, and control modules for controlling the operators each have a data control memory with a plurality of instruction words, the instructions words at one selected address in the control data memories being simultaneously transferred to corresponding control registers which control the selectors of the operators to thus produce an arrangement of the operators for performing a selected array processing configuration. The array processor unit includes a local data memory which receives and transmits data over a global data bus to a global memory unit in accordance with instructions signals on the global control bus as applied by a control processor unit which includes a local program memory and a program execution unit controlled by a program in the local program memory for operating the data processing system.

DESCRIPTION OF THE PREFERRED EMBODIMENT

Figure 1:
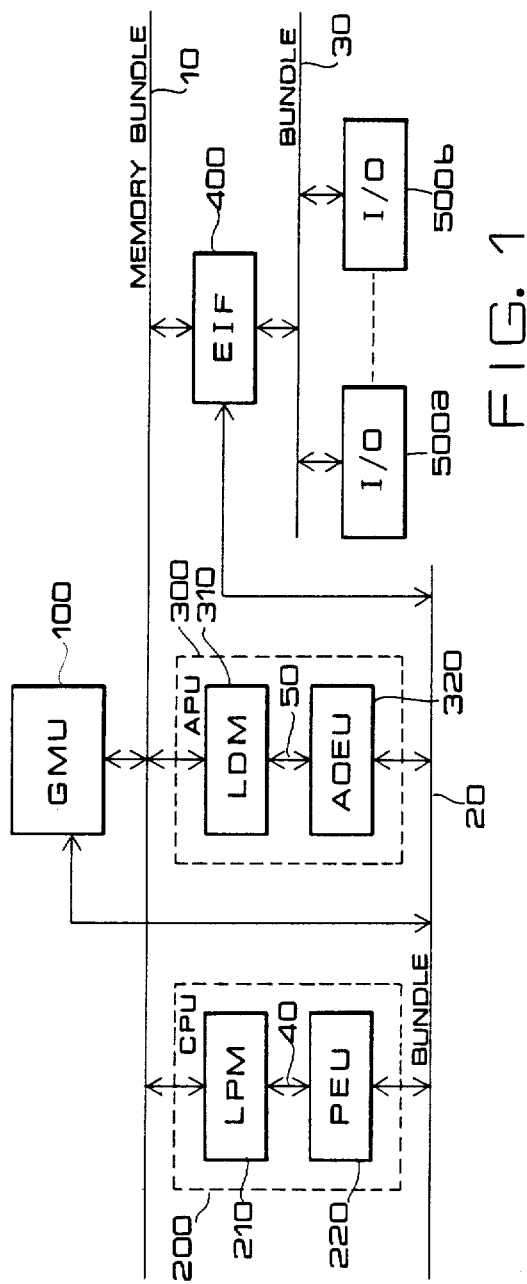
FIG. 1 is a structural diagram of the data processing system for array computation embodying the present invention.

FIG. 1 shows generally the data processing system embodying the present invention for array computation, where the system includes functional units 100, 200, 300, 400, 500a and 500b which will be described below in detail and also shows bundles of buses 10, 20 and 30 (hereinafter simply referred as "bundles").

Data including array and scalar data and programs are stored in a global memory unit (GMU) 100 having a large storage capacity, programs to be executed and related date therewith are transferred from the GMU 100 to a local program memory (LPM) 210 within a control processor unit (CPU) 200 via the bundle 10. The CPU 200 is a computer having the LPM 210 and a program execution unit 220 used as a main memory and a central processing unit, respectively. Control related to data processing is mostly carried out by the program execution unit (PEU) 220 within the CPU 200 through the execution of programs read out from its LPM 210. Accordingly, program execution by the PEU 220 normally takes place internally without accessing the other functional units. If an access of a new program is required or the result of program execution is requested to be stored in the GMU 100, data transfer takes place between the GMU 100 and the LPM 210. Thus, a frequent routine access to the GMU 100 by the CPU 200 is avoided, that allows other functional units to have more opportunity of accessing the GMU 100.

The PEU 220 is linked with the LPM 210 through the bundle 40 for executing instruction fetch and data read and write. The PEU 220 performs the sequential execution of macroinstructions defined in machine words in the present invention, and also performs the control necessary for reading out macroinstructions, decoding instructions, reading out data, executing instructions, and writing the execution result by use of microprograms.

For processing of vast array data stored in the GMU 100, there is connected to the bundle 10 an array processor unit (APU) 300, which consists of a local data memory (LDM) 310 and an array operation execution unit (AOEU) 320. Array data to be processed is first read out of the GMU 100 and transferred to the LDM 310. Then, data in the LDM 310 is read out and supplied to the AOEU 320, and the result of processing by the AOEU 320 is sent back to the LDM 310. In this way, data is transferred between the LDM 310 and the AOEU 320 for a necessary number of times. The final result stored in the LDM 310 is then transferred to the GMU 100.

Function unit 400 is provided as an external interface (EIF), adapted to control data transfer between the GMU 100 and I/O devices 500a and 500b, such as to a display unit or a real-time signal input unit connected through the I/O bundle 30 to the unit 400.

The control processor unit 200 controls the overall data processing system by sending control data to the APU 300, GMU 100 and EIF 400, and receiving status data from these units via the control bundle 20. Array computation by the APU 300 and data transfer for the EIF 400 are controlled by the CPU 200 using the control bundle 20.

Figure 2:
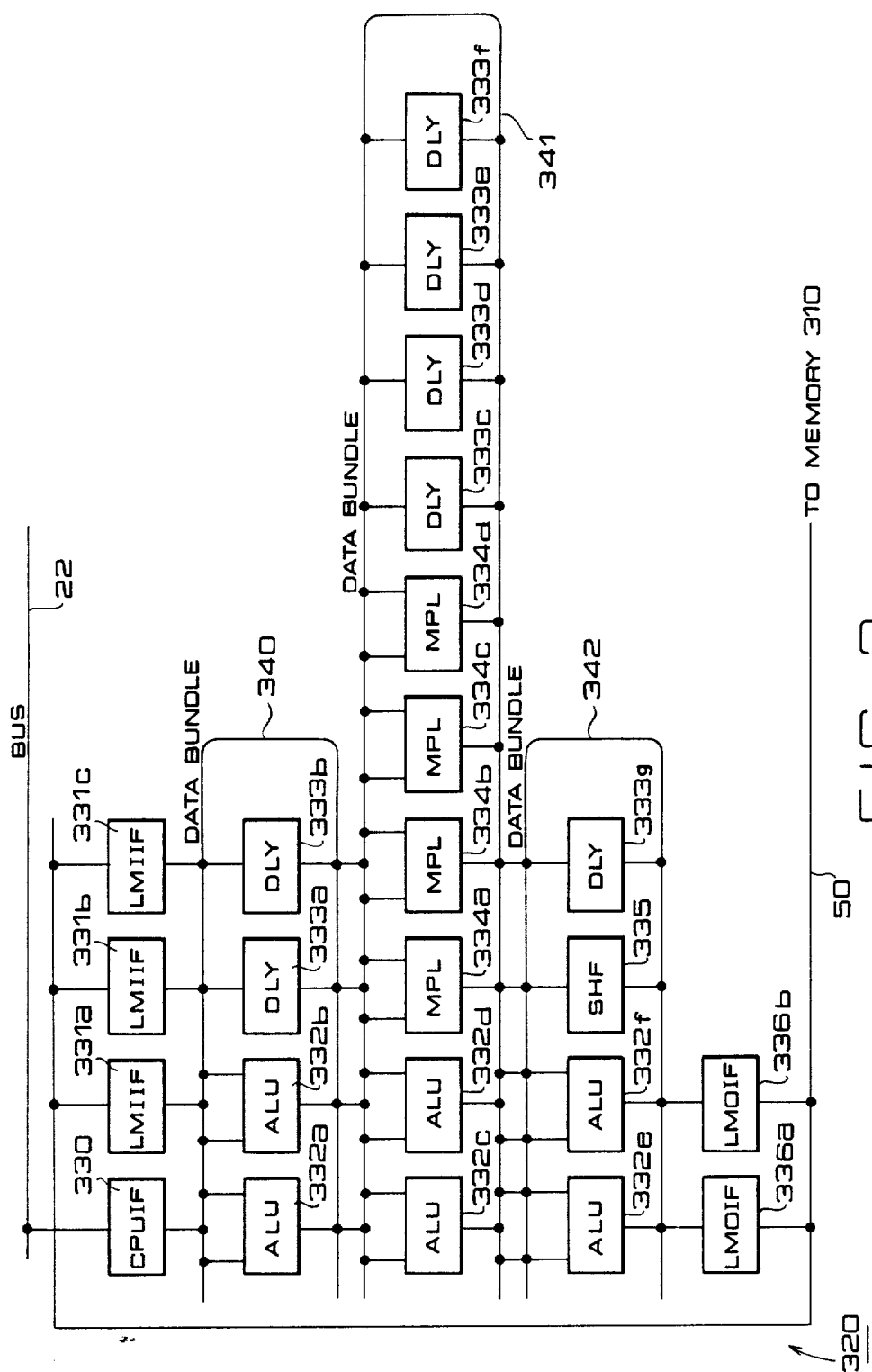
FIG. 2 is a block diagram showing in detail an array processor unit in the system of FIG. 1.

FIG. 2 shows the arrangement of the array operation execution unit 320, which consists of a control processor unit interface (CPUIF) 330, local data memory input interfaces (LMIIF) 331a–331c, arithmetic logic units (ALU) 332a–332f, delay circuits (DLY) 333a–333g, multipliers (MPL) 334a–334d, a shifter (SHF) 335, and local data memory output interfaces (LMOIF) 336a and 336b. These arithmetic logic operators have their inputs and outputs connected to the local data bundles 340, 341 and 342 as shown in the figure.

Normally, data read out from the LDM 310 is sent to the arithmetic operators via the input interfaces 331a–331c and selected buses of the bundle 340, and the result of operation is sent back to the LDM 310 via the output interfaces 336a and 336b from selected buses of the bundle 342. Since each of the data bundles 340, 341 and 342 is made up of a plurality of data buses, a number of data transfers between operators take place concurrently. The sort of operation applied to data entered via the input interfaces 331a–331c is dependent on the selection of input data or input bus connection by each operator and the selection of output bus connection for data from each operator, and these selections can be determined arbitrarily corresponding to the type of array computation. Each operator consists of an arithmetic circuit connected to an input data selection circuit for selecting one or two input buses, a register for holding the result of operation, and a selection circuit for sending the resultant data to a selected output bus of a data bundle.

Figure 3:
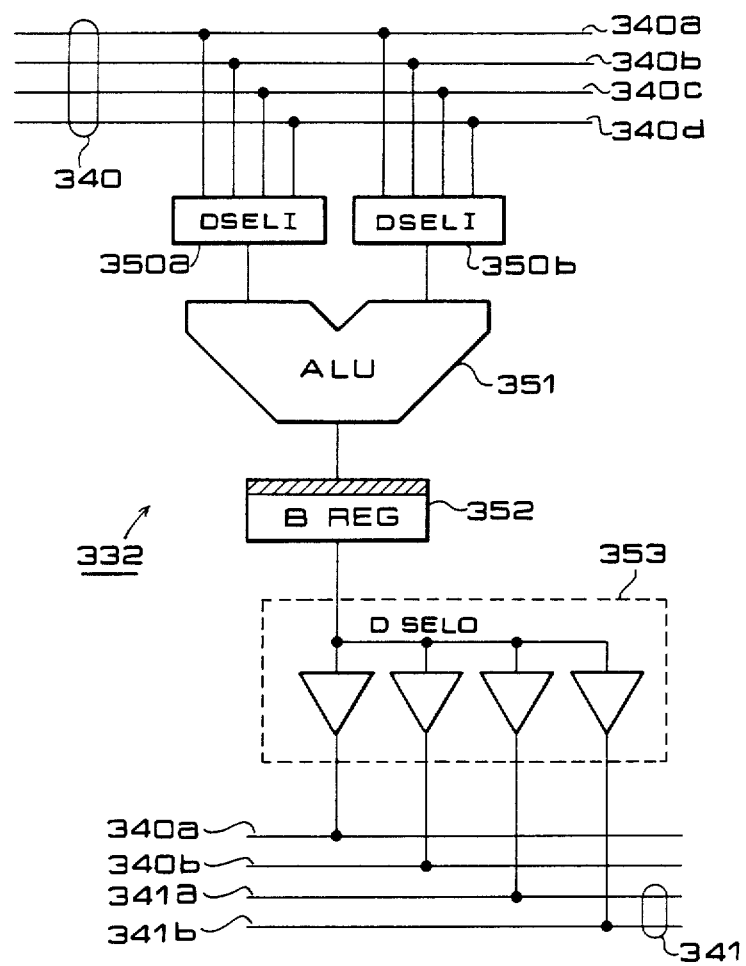
FIG. 3 is a block diagram showing an arithmetic logic unit in the unit of FIG. 2.

As an example of the arithmetic circuit, FIG. 3 shows in detail the arrangement of the arithmetic logic unit 332a shown in FIG. 2. Shown in the figure are data buses 340a–340d constituting the data bundle 340, input data selectors (DSELI) 350a and 350b, arithmetic logic unit (ALU) 351, buffer register (B REG) 352 for holding the result of operation, output data selector (DSELO) 353, and data buses 341a and 341b constituting the data bundle 341.

Figure 4:
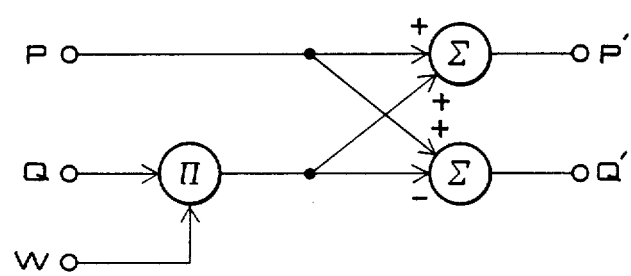
FIG. 4 is a data flow diagram showing a butterfly computation which can be performed by the system of FIG. 1.

When an output of a first operator is connected to the input of a second operator by corresponding output and input selectors selecting the same data bus, data held in the register of the first operator is applied to the input of the second operator and the result of the second operator is held in its own register. The array operation unit 320 shown in FIG. 2 is designed so that between register data transfers complete within one cycle. Namely, all registers of operators in the AOEU 320 operate synchronously, and when data is entered through the input interface 331a–331c at the beginning of a cycle, the result of operation is output through the output interface 336a and 336b at the end of the cycle, thereby allowing pipelined processing for the computation. As an example of pipelined processing for the computation, FIG. 4 shows the butterfly process which is widely used in the fast Fourier transformation process. The butterfly process depicted in FIG. 4 is derived from the following equations.

$$P' = P + QW$$
$$Q' = P - QW \qquad (1)$$

where W represents a rotation factor and P, Q, W, P' and Q' represent complex numbers each having a real integer and imaginary integer.

Figure 5:
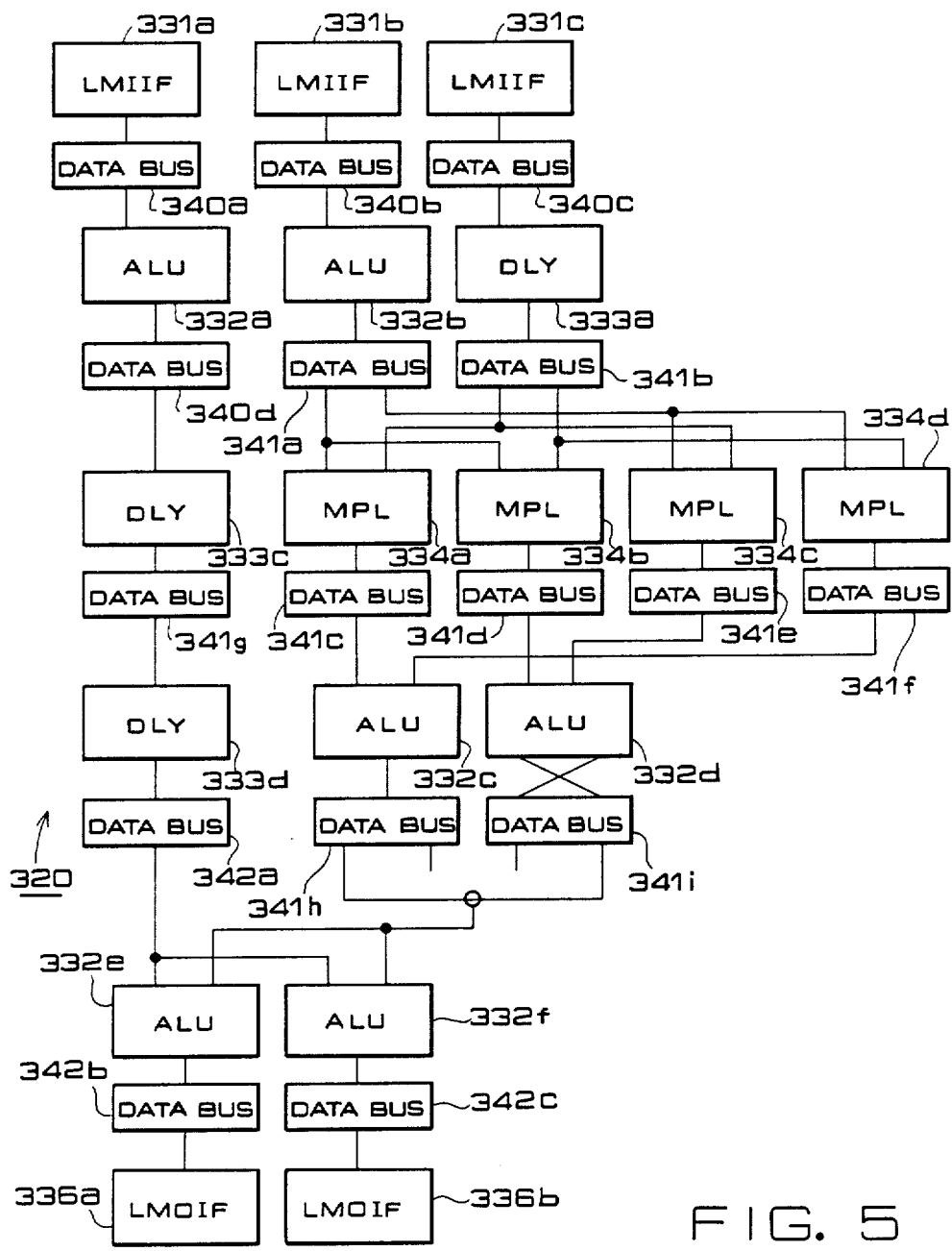
FIG. 5 is a diagram showing the connection of arithmetic operators within the array processor unit of FIG. 2 to perform the computation of FIG. 1.

FIG. 5 shows the arrangement of the AOEU 320 for carrying out the butterfly process. The figure shows operators 331a-331c, 332a-332f, 333a, 333c, 333d, 334a-334d, 336a, and 336b which are the same as those of FIG. 2, and respectively shows data buses 340a-340d in the data bundle 340, data buses 341a-341i in the data bundle 341, and data buses in the data bundle 342.

The butterfly process depicted in FIG. 5 is derived from Equation (2), which differs from Equation (1) for the purpose of avoiding overflow.

$$P' = \tfrac{1}{2}P + QW$$

$$Q' = \tfrac{1}{2}P - QW \qquad (2)$$

The arrangement of FIG. 5 will be described with the following assumption:

1. Data length: 1 word (2n bits)
2. Real data: Half word (n bits) or 1 word (2n bits). (Word "real" is used in connection with "complex", and it means here a signed integer.)
3. Complex data: Half word (n bits) for the real part and half word (n bits) for the imaginary part. Complex number X = Re (X) + jIm (X) is packed in one word with its real part Re (X) and imaginary part Im (X) expressed in a signed integer of half word (n bits) each.
4. Operator's data size: Half word (n bits) × 2 or 1 word (2n bits) × 1. All operators except for multipliers operate in full-word mode or half-word mode, the former performing computation in 2n-bit (1 word) data size, and the latter divides an operator into two n-bit operators each performing computation independently. Multipliers always take n-bit operands and provide 2n-bit result.
5. Data bus: Half word (n bits) × 2. Data buses 340a-340c have the 2n-bit size, each being selected by the operator's output registers in half-word units.

With these assumptions the operation of the operators shown in FIG. 5 will now be described. In the following description, <F> indicates the computation in full-word mode, and <H> indicates the computation in half-word mode.

(a) Input interface units 331a and 331b <H> enter data:

$$P = Re(P) + jIm(P)$$

and $$Q = Re(Q) + jIm(Q),$$

and input interface unit 331c enters input data:

$$W = Re(W) + jIm(W)$$

(b) Arithmetic logic units 332a and 332b <H> perform equations:

$$X = \tfrac{1}{2}Re(P) + j\tfrac{1}{2}Im(P)$$

and $$Y = \tfrac{1}{2}Re(Q) + j\tfrac{1}{2}Im(Q),$$

and delay circuit 333a <H> receives data:

$$W = Re(W) + jIm(W),$$

and provides delayed data Z in correspondence to the ALUs 332a and 332b.

(c) Multipliers 334a, 334b, 334c and 334d perform the following computations respectively:

$$Drr = Re(Y) \times Re(Z),$$

$$Dri = Re(Y) \times Im(Z),$$

$$Dir = Im(Y) \times Re(Z),$$

and $$Dii = -Im(Y) \times Im(Z).$$

Delay circuit 333c <H> receives data:

$$Z = Re(Z) + jIm(Z),$$

and provides the delayed output in correspondence to the multipliers 334a-334d as data C.

(d) Arithmetic logic units 332c and 332d <F> perform the following computations respectively:

$$Er = Drr + Dii,$$

and $$Ei = Dri + Dir.$$

Delay circuit 333d <H> receives data:

$$C = Re(C) + jIm(C),$$

and provides the delayed output in correspondence to the ALUs 332c and 332d as data B.

(e) Arithmetic logic units 332e and 332f <H> perform the following computations respectively:

$$P' = [Re(B) + Er/2^n] + j[Im(B) + Ei/2^n]$$

and $$Q' = [Re(B) - Er/2^n] + j[Im(B) - Ei/2^n],$$

and send out the results via the data buses 342b and 342c and the output interface units 336a and 336b, respectively.

The foregoing array computation is used where the computation precision is not of great concern, and the connection between operators can be altered dynamically depending on its goal.

The following describes the structure and operational control of the array operation execution unit 320 shown in FIG. 2 that forms the nucleus of the present invention.

In FIG. 1, the array processor unit 300 is controlled by the control processor unit 200 through the control bundle 20, as shown in FIG. 6. The control bundle 20 includes a control command bus (CCB) 21 connected to a control command register (CCR) 221 and a control data bus (CDB) 22 connected to a control data register (CDR) 222 within the program execution unit 220. The control command bus 21 is used to select an array function to be performed by the program execution unit 220. The control data bus 22 is used to transfer data from the program execution unit 220 to other unit, and vice versa. Loading of data to the registers 221 and 222 is carried out by microinstructions executed in the program execution unit 220, transmission and reception of command and data are also controlled using microinstructions. The control bundle 20 as mentioned above is connected to control modules which control input selectors of operators to select input data, control the functions of operators, control the output selectors of operators for selecting data applied to various data buses, and control the memories, as shown in FIGS. 7(a) and 7(b).

The arrangement of FIG. 7(a) includes control modules (CMOD) 360a, 360b and 360c, and operators, data bus or data memory O/DB 370a, 370b and 370c. FIG. 7(b) shows that each control module 360 consists of a control data memory (CDM) 361, data selection circuit (DSEL) 362 and control register (CREG) 363 which sends the control signal to the operator, data bus or data memory (O/DM) 370.

In FIG. 7(b), control data for selecting input data and controlling the function of an operator, and control data for selecting the outputs of operators to the data buses are held in the control register 363. This control data is normally read out from the control data memory 361 which contains various control data. The memory 361 is addressed through the control command bus 21 in the control bundle 20. A data selection circuit 362 is provided so that data on the control data bus 22 can be loaded directly to the control register 363.

By provision of the above-mentioned control module 360, when control data for frequent operations carried out by the array operation execution unit 320 are stored in the control data memory 361 in advance, control data stored in a memory location is read out and loaded to the control register merely by specifying the address through the control command bus 21 in the control bundle 20. Control data which is not stored in the control data memory 361 can be loaded to the control register 363 directly using the control data bus 22.

Figure 8:
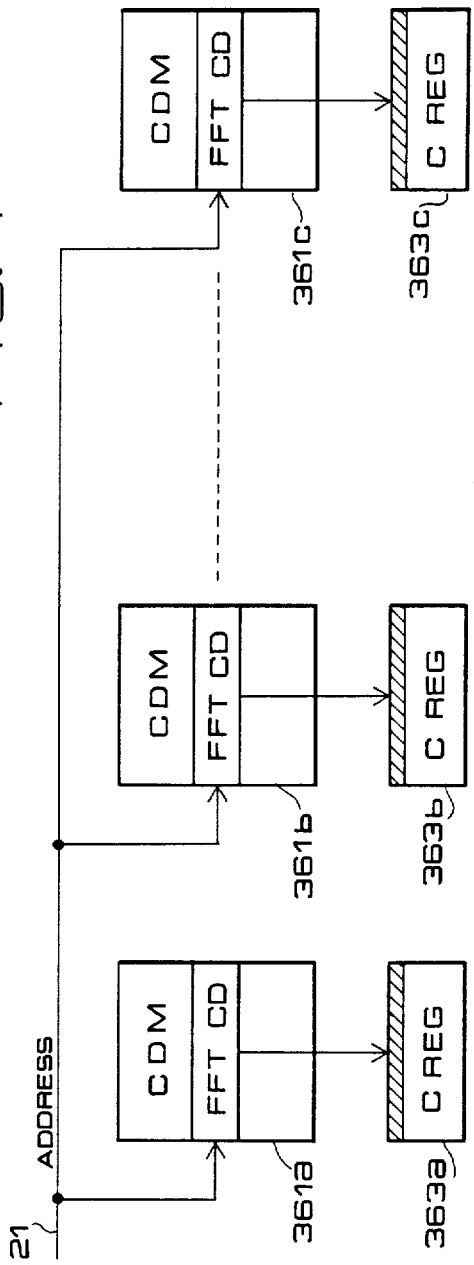
FIG. 8 is a diagram showing a read operation for control data memories of the control modules of FIGS. 7a and 7b to perform a fast Fourier transform array computation.

FIG. 8 shows the connection of the control data memory. When the control modules shown in FIG. 8 are addressed by the control command bus 21, control data stored in the control data memories 361a-361c in all control modules are read out and loaded to the respective control registers 363a-363c simultaneously. For example, when the address of FFT control data is provided on the control command bus 21, FFT control data stored in the same address of all control data memories are read out and loaded to the control registers.

This function allows considerable reduction of time for loading control data for many operators to the control registers. This results in a reduction of overhead in making suitable arrangement dynamically for carrying out various array computations in the array operation execution unit.

The following describes an example of a program which is performed by the CPU 200 to control the effective use of operators and control modules in the array operation execution unit 320.

The following table shows part of the program for fast Fourier transformation (FFT).

TABLE

| 100 |      | LDI  | R3, −4      |
| 101 | LOOP | LD   | R0, SA      |
| 102 |      | LD   | R1, DSN     |
| 103 |      | LDI  | R2, 32      |
| 104 |      | CMF  | FFT         |
| 105 |      | LD   | F4, DSN     |
| 106 |      | MPY  | R4, R2      |
| 107 |      | ADD  | R0, R5      |
| 108 |      | ST   | R0, SA      |
| 109 |      | ADDI | R3, 1       |
| 110 |      | BCD  | ZERO, NEXT  |
| 111 | TSTL | TST  | CMFEND, LOOP|
| 112 |      | BCD  | TRUE, TSTL  |
| 113 | NEXT | LD   | R0, NSA     |

The program executes operations as follows.

Step 100: Load register R3 as a loop counter for FFT. In the example of FIG. 8, R3 is loaded with −4 so that the looping is done by 4 times.

Step 101: At the beginning of the FFT loop, load register R0 with the starting address SA specifying the address of data stored in the global memory unit.

Step 102: Load register R1 with the number of data sets DSN.

Step 103: Load register R2 with "32" which is the number of sampling points for FFT.

Step 104: Carry out the FFT operation using the data starting address, the number of data sets, and the number of samples stored in registers R0, R1 and R2, respectively.

Step 105: Load register R4 with the number of data sets DSN.

Step 106: Multiply the contents of registers R4 by that of R2, and store the upper and lower digits of the result in registers R4 and R5, separately. Thus, the number of data subjected to the FFT operation is obtained.

Step 107: Add the contents of register R5 to the data starting address (register R0). Thus, the data starting address for the next FFT operation is generated.

Step 108: Store the data starting address for the next FFT operation calculated in step 107 into SA.

Step 109: Increment the loop counter (register R3) by 1.

Step 110: If the result of step 109 is 0, go to step 113 labeled by NEXT; otherwise, proceed to step 111.

Step 111: Test whether the FFT operation carried out in step 104 has completed. If it has completed, go to LOOP in step 101; otherwise, proceed to the next step.

Step 112: If the condition is met, go to step 111 labeled by TSTL.

In the program shown in the table, the CMF instruction (call macrofunction) initiates the FFT operation in the array processor unit. The load instructions LD and LDI, add instructions ADD and ADDI, multiply instruction MPY, store instruction ST, conditional branch instruction BCD, and test instruction TST are processed by microprograms in the control processor unit. The CMF instruction terminates the process by activating the array processor unit which has performed control necessary for starting an array operation specified by the CMF instruction for the connection between operators and selection of operations in the array operation execution unit. The instruction following the CMF instruction can be executed before the array operation has completed in the array processor unit, that allows concurrent operation of the control processor unit and the array processor unit. The TST instruction in step 111 is used to test whether or not array computations in the array processor units activated by the CMF instruction has completed.

As described above, the use of the CMF instruction dedicated to control array computation allows parallel processing to improve the process speed.

A particular data processing system for array computation has been described, however, the present invention is not limited to the illustrated arrangement, but it is intended to cover all embodiments and modifications thereof as fall within the scope of the appended claims.

What is claimed is:

1. A data processing system for array computation comprising:
    a global data bus, and a global control bus;
    a global memory unit connected to the global data bus and the global control bus for receiving and storing vast array data, scalar data, and program data from the global data bus and for passing the vast array data, scalar data and program data onto the global data bus in response in corresponding instructions on the global control bus;
    an array processor unit connected to the global data and global control buses, said array processor unit including a local data memory for receiving, storing and passing array data used in array computation from and to the global data bus in response to corresponding instructions on the global control bus, and including array operation execution means for receiving and performing array processing on array data from the local data memory and for passing the processed array data back to the local data memory in response to corresponding instructions on the global control bus;
    an external interface unit connected to the global data and control buses for transferring data between the global data bus and external devices in response to corresponding instructions on the global control bus;
    a control processor unit connected to the global data and control buses, said control processor unit including a local program memory for receiving, storing and passing scalar data and program data from and to the global data bus, and including program execution means for reading and executing a program in the local program memory to produce the control instructions on the global control bus controlling the transfer of data between the global memory and the local data memory of the array processor, the external interface unit, and the local program memory of the control processor unit, and controlling the array operation execution means of the array processor unit;
    said array operation execution means of the array processor unit including two or more pluralities of local data buses, a plurality of operators wherein each operator is connected to at least one plurality of the pluralities of data buses and shares the connected buses with other operators connected thereto, and a plurality of control modules connected to the respective operators and the global control bus for controlling the operators in response to control instructions on the global control bus;
    said plurality of operators including memory input interface circuits and memory output interface circuits connected between the local data memory and respective pluralities of the local data buses, arithmetic logic operators having inputs and outputs connected to respective pluralities of the local data buses, delay circuits having inputs and outputs connected to respective pluralities of the local data buses for holding selected data while other operators process other data, and multipliers having inputs and outputs connected to respective pluralities of the local data buses;
    said input interface circuits each including output selector means for selecting respective buses of the pluralities of local data buses for transfer of array data from the local data memory;
    said arithmetic logic operators, said delay circuits, and said multipliers each including input selector means and output selector means for connecting their respective inputs and outputs to corresponding local data buses of the pluralities of local data buses in various selected matrix, parallel and series arrangements to perform various array computations;
    said output interface circuits each including input selector means for selecting respective buses of the pluralities of local data buses for transfer of array data to the local data memory;
    said control modules of the array processor unit each including a control register connected to respective operators of the array processor unit for operating the input and output selector means of the operators, and including control data memory means containing a plurality of control data words and connected to the control register and the global control bus for passing a respective control data word from the control data memory means to the control register in accordance with a corresponding data memory address instruction on the global control bus; and
    said plurality of control data memory means all responding to the same plurality of data memory address instructions on the global control bus and said control data words in the plurality of control data memory means being selected so that a corresponding arrangement of the operators to perform a selected array computation is produced for each of the plurality of instructions on the global control bus.

2. A data processing system as claimed in claim 1 wherein said control processor unit performs processing of scalar data in parallel with processing of array data by said array processor unit.

3. A data processing system as claimed in claim 1 wherein the control data words in the plurality of control data memory means for one data memory address instruction corresponds to an arrangement of the operators to perform a fast Fourier transformation on array data.

* * * * *